United States Patent
Wildgen

(10) Patent No.: US 6,170,327 B1
(45) Date of Patent: Jan. 9, 2001

(54) AIR MASS METER

(75) Inventor: Andreas Wildgen, Nittendorf (DE)

(73) Assignee: Siemens Aktiengesellschaft, Munich (DE)

( * ) Notice: Under 35 U.S.C. 154(b), the term of this patent shall be extended for 0 days.

(21) Appl. No.: 09/099,241

(22) Filed: Jun. 15, 1998

Related U.S. Application Data

(63) Continuation of application No. PCT/DE96/02054, filed on Oct. 29, 1996.

(30) Foreign Application Priority Data

Dec. 15, 1995 (DE) .............................. 195 46 996

(51) Int. Cl.$^7$ .......................................... G01F 1/68
(52) U.S. Cl. .......................................... 73/204.26
(58) Field of Search .......................... 73/204.26, 204.25, 73/204.27, 204.23, 204.11

(56) References Cited

U.S. PATENT DOCUMENTS

| | | | |
|---|---|---|---|
| 4,803,875 | 2/1989 | Kuhn et al. ........................ | 73/204.26 |
| 4,944,182 | 7/1990 | Gneiss et al. ...................... | 73/204.26 |
| 5,319,971 | 6/1994 | Osswald et al. ................... | 73/204.26 |

FOREIGN PATENT DOCUMENTS

| | | |
|---|---|---|
| 2171800A | 9/1986 | (GB) . |
| 2179161A | 2/1987 | (GB) . |

OTHER PUBLICATIONS

Published International Application No. 95/21370 (Wildgen et al.), dated Aug. 10, 1995.

*Primary Examiner*—Harshad Patel
(74) *Attorney, Agent, or Firm*—Herbert L. Lerner; Laurence A. Greenberg; Werner H. Stemer

(57) ABSTRACT

The air mass meter a heating element and, downstream of the heating element, a disturbance body disposed in a duct element. The heating element and the disturbance body are geometrically shaped and arranged in the duct element such that the heating element is surrounded by a laminar flow at all the flow velocities of the air in the duct element which are operationally relevant to an internal combustion engine. The heat transmitted to the heating element is consequently determined only by the mass of the air flowing past and error-inducing flow disturbances are avoided.

10 Claims, 3 Drawing Sheets

AIR MASS METER

CROSS-REFERENCE TO RELATED APPLICATION

This is a continuation of copending international application PCT/DE96/02054, filed Oct. 29, 1996, which designated the United States.

BACKGROUND OF THE INVENTION

1. Field of the Invention

The invention relates to an air mass meter for the intake port of an internal combustion engine, with a temperature sensor which records the temperature of the air in the intake port, and with a heating element which has a strip-shaped substrate and a heating resistor applied to one side of the substrate.

An earlier, commonly owned international application (WO 95/21370) describes an air mass meter which has a temperature sensor resistor and a sensor heating resistor. The sensor heating resistor is heated to a predetermined excess temperature, as compared with the temperature measured at the temperature sensor resistor. The electric current, which flows through the sensor heating resistor, and the voltage, which drops across a temperature-independent series resistor, are, when squared, directly proportional to the heating capacity which is delivered in the sensor heating resistor. The air mass flow can thus be determined from these variables.

Deposits of dirt on the onflow surface of the sensor heating resistor which face into the flow may lead to variations in heat transfer on the sensor heating resistor. The increasing deposits of dirt result in an increasingly greater measuring error.

A prior art air mass meter described in German published, non-prosecuted patent application DE 38 38 466 A1 has a temperature sensor and a heating element with a striplike substrate and a heating resistor applied to the substrate. A body member is arranged on one end face of the substrate, facing into the flow of the air. That body member is disposed and configured such that, when the air mass meter is new, a flow profile is already established around the substrate which resembles the flow profile that is established, without the body, as a result of deposits of dirt after a certain amount of operating time. Deposits of dirt on the body member may, however, lead to a variation in heat transfer on the heating resistor. Increasing deposits of dirt thereby result in an increasingly greater measuring error.

For the purpose of eliminating deposits of dirt, a prior art air mass meter described in German patent DE 42 28 524 C1 has a U-shaped yoke which is mounted movably in a frame. A first free end region brushes against the onflow surface of the sensor heating resistor. A second free end region of the yoke is driven by the air flow in the intake port. The position of the first free end region consequently varies with the velocity of the air flow. The first end region of the yoke thus eliminates deposits of dirt on the onflow surface mechanically. The disadvantage of this air mass meter, however, is that is requires complicated mechanical parts in order to eliminate the deposits of dirt.

SUMMARY OF THE INVENTION

It is accordingly an object of the invention to provide an air mass meter, which overcomes the above-mentioned disadvantages of the prior art devices and methods of this general type and which reduces measuring errors as a result of deposits of dirt on an end-face onflow surface of a heating element.

With the foregoing and other objects in view there is provided, in accordance with the invention, an air mass meter for an intake port of an internal combustion engine, comprising:

a temperature sensor disposed in an intake port of an internal combustion engine for measuring a temperature of air flowing in the intake port;

a heating element disposed in the intake port, the heating element being formed of a strip-like substrate and a heating resistor applied to one side of the substrate;

a disturbance body disposed in the intake port downstream of the heating element relative to a flow of air in the intake port;

the heating element and the disturbance body being configured and placed at a relative distance from one another, such that a heat transfer from the heating element to the air flowing in its vicinity is influenced only negligibly by deposits of dirt on an onflow surface of the heating element, in that a relative error due to the deposits of dirt does not increase sharply above a predetermined critical air throughput after a predetermined operating time of the air mass meter.

In accordance with an added feature of the invention, the heating element has a cuboid shape, with a length of the heating element parallel to the air flow between 0.5 and 0.9 mm, and a ratio of the length to a height of the onflow surface in a range from 3 to 6.

In accordance with an additional feature of the invention, the length is 0.6 mm, the height of the onflow surface is 0.15 mm and a width of the heating element is 9 mm.

In accordance with another feature of the invention, the substrate of the heating element is a glass substrate and the disturbance body consists of metal.

In accordance with a further feature of the invention, the disturbance body is aligned with the heating element in a direction of flow of the air.

In accordance with again another feature of the invention, the heating resistor is a platinum resistor disposed in a meandering resistance path on the substrate.

In accordance with a concomitant feature of the invention, there is provided a reheating element disposed between the heating element and the disturbance body.

Other features which are considered as characteristic for the invention are set forth in the appended claims.

Although the invention is illustrated and described herein as embodied in an air mass meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
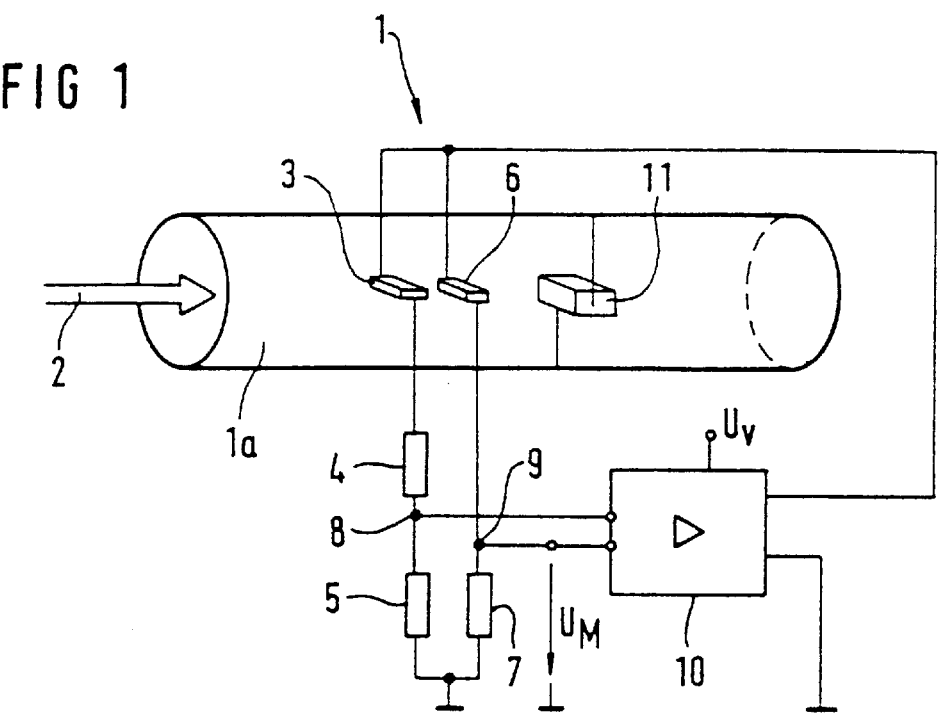
FIG. 1 is a schematic block diagram of an air mass meter according to the invention.

Referring now to the figures of the drawing in detail and first, particularly, to FIG. 1 thereof, there is seen an air mass meter 1 with a duct element 1a that forms a portion of the intake port of an internal combustion engine. Air flows through the duct element 1a in the direction designated by an arrow 2. A temperature sensor 3, a first resistor 4 and a second resistor 5 are located in a first bridge branch of a measuring bridge which is an integral part of an evaluation circuit of the air mass meter 1. A heating element 6, which has a heating resistor on a glass substrate, and a third resistor 7 are located in a second bridge branch of the measuring bridge. An amplifier 10 is connected to a first tap 8 between the first and second resistors 4, 5 and to a second tap 9 between the heating element 6 and the third resistor 7. When the bridge becomes detuned, the amplifier regulates the bridge current in such a way that the bridge diagonal voltage is compensated again, that is to say reaches a predetermined value (for example, 2 mV) up to the voltage difference between the first and second pickup points 8 and 9.

The voltage drop across the third resistor 7 is therefore a measure of the air mass flow flowing past the heating element 6 and thus forms an air mass signal $U_M$.

A disturbance body 11 is disposed downstream of the heating element 6 in the duct 1a. In the exemplary embodiment, the disturbance body 11 is a cuboid. The body 11 results in a buildup of the air flow (referred to as "damming effect" in the following) in the region of the heating element 6.

Figure 2:
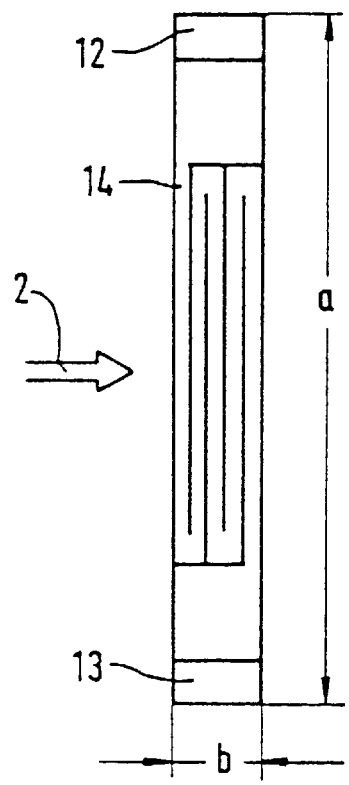
FIG. 2 is a side view of a heating element of the air mass meter according to FIG. 1.

With reference to FIG. 2, the heating element 6, which has a cuboid shape, has contact points 12, 13 and a meanderlike resistance path 14 which runs perpendicularly to the direction of flow 2. The resistance path 14 consists of platinum, molybdenum or nickel and is applied to a glass substrate. The width of the resistance path 14 increases in the direction of flow 2 of the air, with the result that its resistance decreases and therefore the heating capacity also decreases. Since the temperature of the air also increases in the direction of flow 2 as a result of the heating effect of the heating element 6, in the case of a laminar flow an approximately equal temperature is achieved over the entire resistance path 14. The response time of the heating element 6 to a change in the air mass flow is thereby kept very low. In the heating element of the exemplary embodiment, the width a is 9 mm, the length b in the direction of flow is 0.6 mm, and the height is 0.15 mm.

Figure 3A:
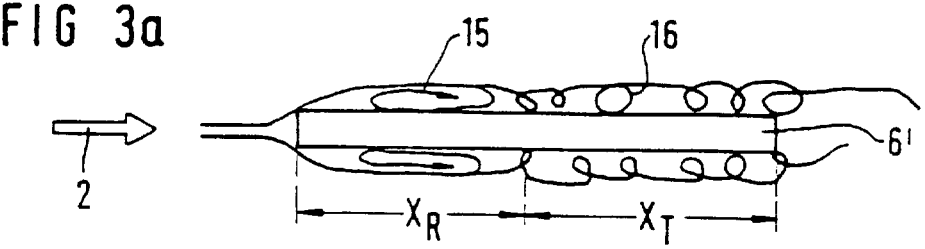
FIGS. 3a and 3b are side views of air flow profiles at a heating element, with and without dirt deposits at the onflow surface.
Figure 3B:
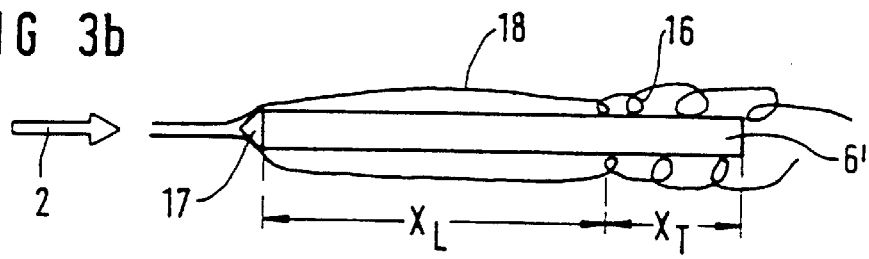

FIGS. 3a and 3b illustrate the flow profiles at a heating element 6' in the above-mentioned commonly owned international publication WO 95/21370, with the flow velocity of the air remaining the same. The heating element 6' is disposed in the duct element 1a.

FIG. 3a shows an unsoiled heating element 6'. In one region of the length $X_R$, the flow has recirculating eddies 15 on the surface of the heating element 6'. The recirculating eddies are depicted as elongate vortices. In the region $X_R$ of the recirculations 15, reduced heat transfer takes place on the surface of the heating element 6', since heated air flows back and forth parallel to the surface of the heating element 6'. The flow has turbulences 16 in a region $X_T$. Increased heat transfer takes place there on the surface of the heating element 6', since new air masses repeatedly impinge on the surface.

With reference to FIG. 3b, deposits of dirt 17 form in the region of the onflow surface of the heating element 6' due to dirt particles which are present in the intake air. The deposits of dirt 17 form cones which initially become increasingly larger and which finally coalesce to form a semicircular body of dirt. Owing to the deposits of dirt, the flow resistance of the heating element 6' changes. As a result, with the flow velocity remaining the same, the region $X_T$, in which turbulent flows occur, becomes smaller. The region $X_R$, in which recirculating eddies 15 occur, disappears completely. Instead, a laminar flow 18 then occurs in the region $X_L$ of the heating element. Heat transfer in the region $X_L$ of the laminar flow 18 is higher than in the case of a recirculation 15, but lower than in the case of a turbulent flow. The deposits of dirt 17 therefore lead to a decrease in heat transfer on the heating element 6'. This results in a measuring error.

Figure 4A:
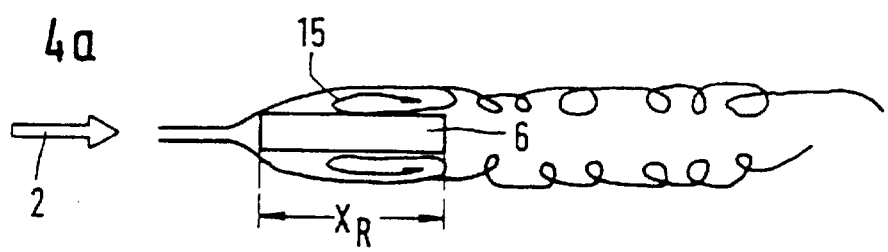
FIGS. 4a and 4b are side views of air flow profiles at the heating element of FIG. 2 without a disturbance body, with and without dirt deposits at the onflow surface.
Figure 4B:
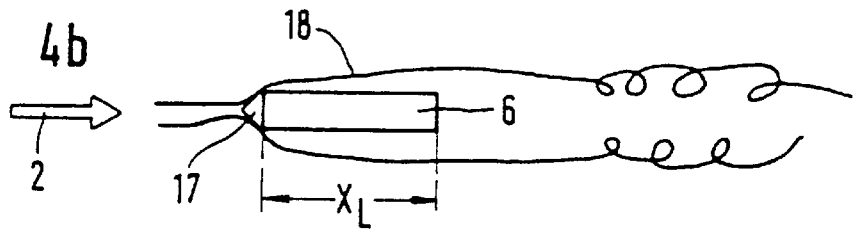

The heating element 6 is illustrated in FIG. 4a and 4b. Its geometry is such that at all the operationally relevant flow velocities of the air, no turbulent flows occur on the surface of the heating element 6, irrespective of deposits of dirt 17 on the onflow surface.

Turbulent flows on the surface of the heating element 6 can be prevented by a minimal height of the onflow surface and a minimal length b of the heating element 6 in the direction of flow. The length b and the height of the heating element 6, however, must have minimum values in order to insure the mechanical stability of the heating element 6.

Tests have shown, surprisingly, that, with a length b in the direction of flow 2 which is in the range of 0.5 to 0.9 mm and with a ratio of the length b to the height of the onflow surface in the range of 3 to 6, no turbulent flows occur on the surface of the heating element. With these dimensions, the mechanical stability of the heating element is still insured.

FIG. 4a shows the flow conditions in the case of the unsoiled heating element. Recirculating eddies occur over the entire surface.

FIG. 4b shows the heating element 6 with dirt deposits 17. The heating element 6 is surrounded by a purely laminar flow 18. In this configuration, therefore, the measuring error is influenced predominantly by the disappearance of the recirculating eddies 15 and the associated increase in heat transfer.

Figure 5:
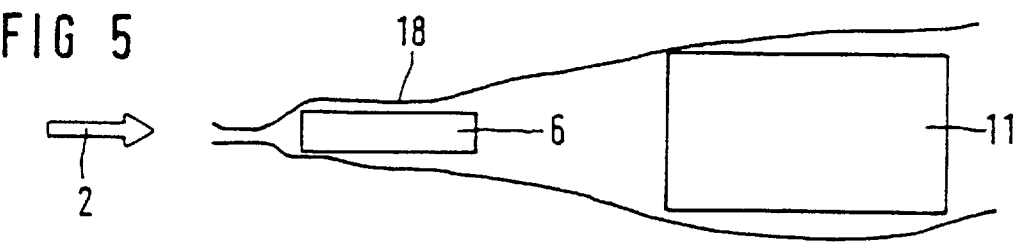
FIG. 5 is a side view of the air flow profile at the heating element of FIG. 2 with a disturbance body.

In the system shown in FIG. 5, the disturbance body 11 is disposed downstream of the heating element 6 relative to the flow of the air. In the exemplary embodiment, the disturbance body 11 has a cuboid shape and it is disposed a distance from the heating element, such that it exerts a damming effect on the heating element 6. Due to the upstream damming effect, the heating element 6 is located in a laminar flow region 18 even when it is in the unsoiled state. In this configuration, therefore, heat transfer changes only very little as a result of its variation in flow resistance due to deposits of dirt 17 on the onflow surface of the heating element 6. At the operationally relevant flow velocities, there forms around the heating element 6 and the disturbance body 11 a flow profile in which heat transfer from the heating element 6 to the air flowing round it is influenced only negligibly by deposits of dirt on the onflow surface of the heating element 6.

Figure 7:
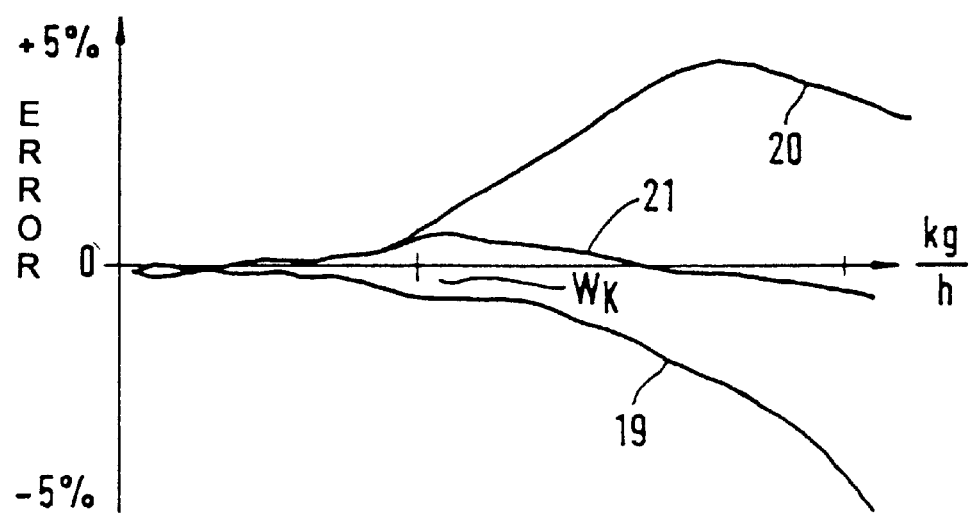
FIG. 7 is a graph plotting a relative error caused by deposits of dirt as a function of the air throughput.

In FIG. 7, the relative error due to deposits of dirt 17 is plotted as a function of the air throughput kg/h through the duct element 1a of the air mass meter 1 after about one hundred thousand kilometers of operation. A first curve 19 represents the error in the case of the heating element 6', a second curve 20 represents the error in the case of the heating element 6 without the disturbance body 11 arranged downstream, and a third curve 21 represents the error in the case of the heating element 6 with the disturbance body 11 disposed downstream therefrom. At an air throughput kg/h which is below a critical value $W_k$ (for example, 200 kg/h), the relative error in the above-mentioned embodiments of the air mass meter 1 is very low. Above the critical value $W_k$, the relative error increases sharply in the embodiment of the air mass meter 1 with the heating element 6 (curve 20). It is evident from FIG. 7 that the relative error in the context of the third curve 21 is minimal. Deposits of dirt on the heating element 6 which has the disturbance body arranged downstream therefore still have only a negligible effect on the measurement result.

Furthermore, in the heating element 6, the measuring error resulting from heat radiation decreases because the overall area of the heating element 6 is reduced.

Figure 6:
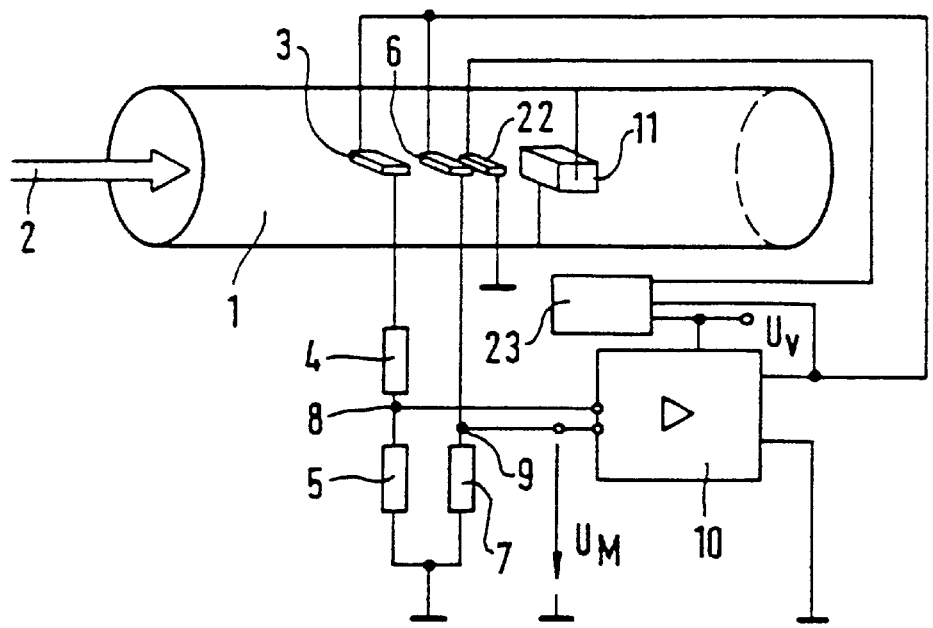
FIG. 6 is a schematic block diagram of a second embodiment of the air mass meter.

In a second embodiment of the air mass meter 1, illustrated in FIG. 6, a reheating element 22 is additionally disposed downstream of the heating element 6. Furthermore, the air mass meter 1 has a control unit 23 which heats the reheating element 22 as a function of the output signal from the amplifier 10. Air masses flowing back are thereby heated to such an extent that they do not absorb any heat from the heating element 6. This avoids the air mass signal $U_M$ from being falsified by air masses flowing back, such as may occur, in particular, in the case of pulsations of air in the intake port.

I claim:

1. An air mass meter for an intake port of an internal combustion engine, comprising:

a temperature sensor disposed in an intake port of an internal combustion engine for measuring a temperature of air flowing in the intake port;

a heating element disposed downstream of said temperature sensor in the intake port, said heating element being formed on a stripe shaped substrate having an onflow surface and a heating resistor applied to one side of the substrate;

a disturbance body disposed in the intake port downstream of said heating element relative to a flow of air in the intake port, said disturbance body is shaped such as to cause a certain desired damming of the airflow;

said heating element and said disturbance body being configured and placed at a relative distance from one another such that said a damming of the airflow due to said disturbance body which has the effect that there is a laminar airflow over said heating element that minimizes the effect of deposits of dirt on said onflow surface of said substrate.

2. The air mass meter according to claim 1, wherein said heating element has a cuboid shape, with a length of said heating element in a direction of flow being from 0.5 to 0.9 mm, and with a ratio of the length to a height of the onflow surface is in a range from 3 to 6.

3. The air mass meter according to claim 2, wherein the length is 0.6 mm, the height of the onflow surface is 0.15 mm and a width of said heating element is 9 mm.

4. The air mass meter according to claim 1, wherein said substrate of said heating element is a glass substrate.

5. The air mass meter according to claim 1, wherein said disturbance body consists of metal.

6. The air mass meter according to claim 1, wherein said disturbance body is aligned with said heating element in a direction of flow of the air.

7. The air mass meter according to claim 1, wherein said heating resistor is disposed in a meandering resistance path on said substrate and said heating resistor consists of platinum.

8. The air mass meter according to claim 1, which further comprises a reheating element disposed between said heating element and said disturbance body.

9. The air mass meter according to claim 1, wherein a heat transfer from said heating element to the air flowing in its vicinity is influenced only negligibly by deposits of dirt on an onflow surface of said heating element.

10. The air mass meter according to claim 1, wherein a relative error due to deposits of dirt does not increase sharply above a predetermined critical air throughput after a predetermined operating time of the air mass meter.

* * * * *